(12) United States Patent
Strömbom

(10) Patent No.: US 10,145,423 B2
(45) Date of Patent: Dec. 4, 2018

(54) UNCOUPLING OF DRIVE

(75) Inventor: Vidar Strömbom, Årsta (SE)

(73) Assignee: SCANIA CV AB (SE)

( * ) Notice: Subject to any disclaimer, the term of this patent is extended or adjusted under 35 U.S.C. 154(b) by 974 days.

(21) Appl. No.: 13/496,535

(22) PCT Filed: Sep. 14, 2010

(86) PCT No.: PCT/SE2010/050977
§ 371 (c)(1),
(2), (4) Date: Mar. 16, 2012

(87) PCT Pub. No.: WO2011/034489
PCT Pub. Date: Mar. 24, 2011

(65) Prior Publication Data
US 2012/0168273 A1    Jul. 5, 2012

(30) Foreign Application Priority Data

Sep. 16, 2009 (SE) ...................... 0950673

(51) Int. Cl.
| F16D 11/10 | (2006.01) |
| F16D 25/08 | (2006.01) |
| F16D 11/00 | (2006.01) |

(52) U.S. Cl.
CPC ............ *F16D 11/10* (2013.01); *F16D 25/088* (2013.01); *F16D 2011/002* (2013.01); *F16D 2500/10431* (2013.01)

(58) Field of Classification Search
CPC ... F16D 11/10; F16D 25/088; F16D 2011/002
(Continued)

(56) References Cited

U.S. PATENT DOCUMENTS

| 1,462,016 A * | 7/1923 | Lewis | .................... B60K 17/02 |
| | | | 192/110 R |
| 3,000,456 A * | 9/1961 | Christie | .................... 180/24.09 |

(Continued)

FOREIGN PATENT DOCUMENTS

| CN | 101224704 A | 7/2008 |
| JP | 51-143223 | 12/1976 |

(Continued)

OTHER PUBLICATIONS

International Search Report dated Oct. 28, 2010 issued in corresponding international patent application No. PCT/SE2010/050977.

(Continued)

*Primary Examiner* — Mark A Manley
(74) *Attorney, Agent, or Firm* — Ostrolenk Faber LLP

(57) ABSTRACT

A device (10) for uncoupling a vehicle's wheel shaft drive, which device is intended to be placed close to a drive shaft (11) in order to uncouple/couple a driven unit to which the drive shaft (11) is coupled. The device (10) comprises includes at least one bearing (12) fitted around the end (13) of the drive shaft (11). A carrier (14) coupled to the unit or to the drive shaft, has an inner cavity large enough to surround the drive shaft's end (13) and the bearing (12) and is fastened in the bearing (12) so as to be freely rotatable relative to the drive shaft (11). A coupling ring (15) is coupled rotationally to the drive shaft (11) and is movable axially relative to the drive shaft (11). A coupling fork (17) at least partly surrounds the coupling ring (15) and is movable axially relative to the drive shaft (11). An activating device which acts upon the coupling fork (17) to move the latter in axial directions along the drive shaft (11). Coupling the drive shaft (11) to the unit involves the coupling fork (17) and the coupling ring (15) being moved axially towards the carrier (14) by the activating device (20) so that the drive (Continued)

shaft (11) becomes rotationally coupled with the carrier (14) and the unit via the coupling ring (15).

11 Claims, 2 Drawing Sheets

(58) Field of Classification Search
USPC .......................................................... 192/108
See application file for complete search history.

(56) References Cited

U.S. PATENT DOCUMENTS

| | | | | |
|---|---|---|---|---|
| 3,929,200 | A | * | 12/1975 | Behar ............................ 180/250 |
| 4,046,210 | A | | 9/1977 | Nelson .......................... 180/24.1 |
| 4,817,752 | A | * | 4/1989 | Lobo .................. B60K 17/3515 |
| | | | | 180/247 |
| 5,090,535 | A | * | 2/1992 | Schiel ................... B21B 35/143 |
| | | | | 192/114 R |
| 5,370,018 | A | * | 12/1994 | Kwasniewski ............. 74/606 R |
| 7,171,867 | B2 | | 2/2007 | McCrary .......................... 74/331 |
| 7,846,056 | B2 | | 12/2010 | Chludek ....................... 475/231 |
| 2006/0272866 | A1 | | 12/2006 | Ziech |
| 2008/0060898 | A1 | | 3/2008 | Liu |

FOREIGN PATENT DOCUMENTS

| | | |
|---|---|---|
| JP | S61-18257 | 6/1986 |
| JP | 8-197974 | 8/1996 |
| WO | WO 02/14092 A1 | 2/2002 |

OTHER PUBLICATIONS

English translation only of Office Action dated Oct. 15, 2013 issued in corresponding Japanese Patent Application No. 2012-529712.
Indian Office Action, dated Jan. 8, 2018, issued in corresponding Indian Patent Application No. 2258/DELNP/2012, Date Filed Mar. 15, 2012. Total 7 pages.

* cited by examiner

UNCOUPLING OF DRIVE

CROSS-REFERENCE TO RELATED APPLICATIONS

The present application is a 35 U.S.C. § § 371 national phase conversion of PCT/SE2010/050977, filed Sep. 14, 2010, which claims priority of Swedish Application No. 0950673-4, filed Sep. 16, 2009, the contents of which are incorporated by reference herein. The PCT International Application was published in the English language.

TECHNICAL FIELD

The invention relates to a device for uncoupling a vehicle's wheel shaft drive.

BACKGROUND

Large vehicles which have a plurality of wheel shafts and are intended for heavy haulage and/or operation in difficult terrain are often provided with drive on two or more of their wheel shafts.

However, vehicles with drive on more wheel shafts tend to have higher fuel consumption than vehicles with drive on fewer shafts even when used in conditions where the extra powered shafts are not necessary for the vehicle's propulsion. This higher fuel consumption is due mainly to increased friction losses in the relating gear devices for power transmission to the various drive shafts.

There are therefore various systems on the market which uncouple the drive of one or more wheel shafts when they are not needed, with the object of reducing the vehicle's fuel consumption.

A system for uncoupling of a wheel shaft drive is described in U.S. Pat. No. 4,046,210 and comprises an uncoupling device placed in the drive shaft gear. However, the available space in the drive shaft gear is very limited in that many different components have to be accommodated therein. Applying that solution on heavy vehicles whose drive shafts and uncoupling devices are subject to great forces means that accommodating in the available space an uncoupling device capable of transmitting such great loads is very complicated.

Another system for uncoupling of wheel shaft drive described in US Patent Publication 2006/0272866 A1 has an uncoupling device placed close to the output shaft from a drive shaft gear. The device comprises an extra shaft placed between the ordinary drive shaft and the power train components which are coupled to the drive shaft. However, that solution with the extra drive shaft means that the uncoupling device occupies considerable axial space, increasing the axial length of the drive shaft gear.

There is therefore a need for a device for uncoupling a vehicle's wheel shaft drive which occupies only a limited amount of space and is capable of transmitting large torques.

SUMMARY OF THE INVENTION

The object of the present invention is to propose an uncoupling device which meets the need described above.

The device for uncoupling a vehicle's wheel shaft drive is intended to be placed close to a drive shaft in order to uncouple/couple a driven unit to which the drive shaft is coupled, and comprises:
 at least one bearing fitted around the end of the drive shaft;
 a carrier which is coupled to the unit or to the drive shaft, has an inner cavity large enough to surround the drive shaft's end and the bearing and is fastened in the bearing so as to be freely rotatable relative to the drive shaft;
 a coupling ring coupled rotationally to the drive shaft and movable axially relative to the drive shaft;
 a coupling fork which at least partly surrounds the coupling ring and is movable axially relative to the drive shaft; and
 an activating device which acts upon the coupling fork to move the latter in axial directions along the drive shaft.

Coupling the drive shaft to the unit involves the coupling fork and the coupling ring being moved axially towards the carrier by the activating device so that the drive shaft becomes rotationally coupled to the carrier and the unit via the coupling ring.

This device has the advantage that it may be placed close to a gearbox output drive shaft but be separate from the gearbox. This is a great advantage in making it easy for the device to be combined with already existing gearboxes without these latter having to undergo time-consuming and expensive modifications.

The device being separate from the gearbox also means that considerably more space is available for the constituent parts of the device, making it possible for them to be dimensioned to withstand the great forces which are transmitted via the drive shaft on heavy vehicles.

The device is also easy to fit in already existing vehicles in that there is no need for it to be integrated in the gearbox or the drive shaft gear for it to function satisfactorily.

A further great advantage of the device according to the invention is that it can be incorporated in existing configurations in that the axial length of the drive shaft can remain unaltered and substantially the only consequence of the carrier being coupled to the driven unit is a somewhat shorter drive shaft for transmission of torque from the carrier to said unit. This is made possible inter alia by the uncoupling device being situated round the end of the drive shaft.

The fact that the device according to the invention is separate from the gearbox also means very easy access, e.g. for service or repair purposes.

In an embodiment of the invention the carrier is adjacent to part of a universal joint. This location of the device and its parts results in minimum changes to existing systems which do not have this coupling/uncoupling facility. It also means that the device is completely separate from the gearbox or the drive at the opposite end of the drive shaft.

In an embodiment of the device the mutually facing sides of the carrier and the coupling ring are provided with matching teeth. This is an embodiment which results in reliable coupling of the carrier and the coupling ring and makes power transmission possible in a satisfactory way.

In an embodiment of the device the coupling ring is rotationally coupled to the shaft via an intermediate element and by a splined connection which allows the coupling ring to move axially relative to the shaft. This embodiment results in characteristics at the fastening which are important for the function of the device, while at the same time the tooth forces during torque transmission are kept at a reasonable level.

In an embodiment of the device the coupling fork is prevented from rotating with the coupling ring and the shaft. This embodiment results in a simple and functional product.

In an embodiment of the device the activating device is powered by compressed air or an electric motor and acts in an axial direction relative to the coupling fork when the coupling ring is to be coupled to/uncoupled from the carrier. Compressed air is used in many vehicles, e.g. for brake systems etc., so it is good to use already existing systems.

In an embodiment of the device the coupling fork is in engagement with the coupling ring about a groove in the outer periphery of the coupling ring. This configuration of the parts results in a simple and reliable solution whereby the coupling fork slides in the groove in the outer periphery of the coupling ring.

The present invention relates also to vehicles which comprise at least one gearbox and an output drive shaft therefrom and a device according to any of the embodiments of the invention. The present invention affords great advantages when fitted in, for example, trucks with tandem drive in that it can be used to uncouple any drive shafts which are not needed, thereby reducing the vehicle's fuel consumption.

In an embodiment of the vehicle the device is placed close to a universal joint. This location and configuration means that few of the vehicle's other components need be modified to incorporate the device in already configured vehicles.

BRIEF DESCRIPTION OF THE DRAWINGS

The invention is explained in more detail below with reference to the drawings.

DETAILED DESCRIPTION OF THE INVENTION

Figure 1:
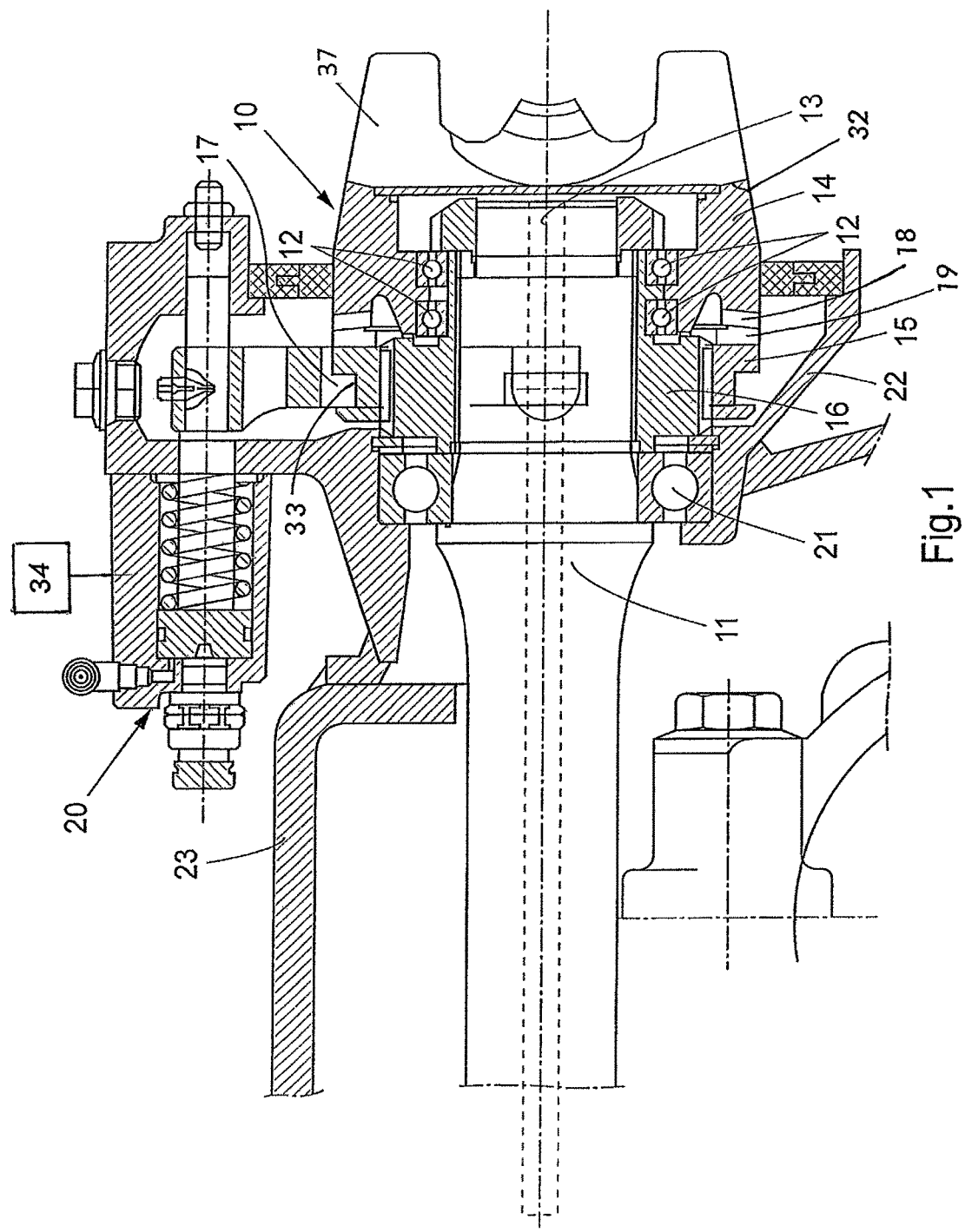
FIG. 1 depicts the device in schematic cross-section.
Figure 2:
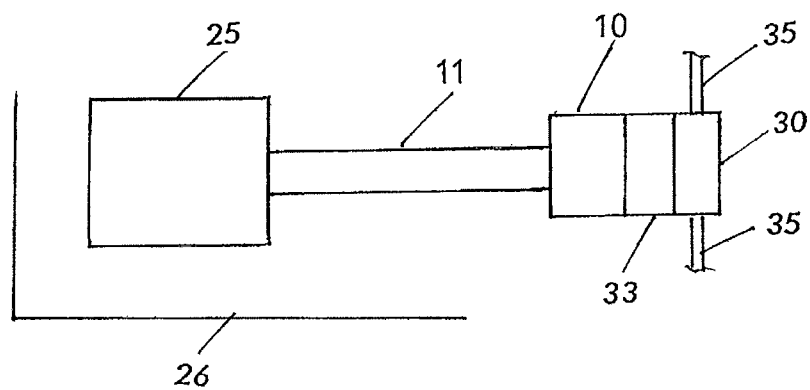
FIG. 2 schematically illustrates a vehicle in which the device may be used.

FIG. 1 depicts a first embodiment of the device 10 for uncoupling/coupling a drive shaft 11 from the engine 25 of a vehicle 26 from/to unit 30. The depicted embodiment of the device 10 comprises two bearings 12 fitted around the drive shaft 11, near to its end 13, to support a carrier 14.

The carrier 14 has a larger outside diameter than the drive shaft 11 and an inner cavity whose diameter is larger than the outside diameter of the two bearings 12 so that the carrier can be placed in such a way as to surround the end 13 and the end nut of the drive shaft 11. The carrier 14 is fastened in the bearings 12 and is therefore free to rotate relative to the drive shaft 11. The end of the carrier 14 is provided with tooth tracks 18 round the whole of its circumference, and the opposite end 32 of the carrier 14 which faces away from the drive shaft 11 constitutes in this embodiment part 37 of a universal joint 33 used for transmission of driving power and angular correction in a transmission system for driving powered wheel shafts 35.

The device further comprises a coupling ring 15 coupled rotationally to, and movable axially relative to, the drive shaft 11. This is possible via a splined connection which couples the coupling ring 15 rotationally to the drive shaft 11 while at the same time the ring is allowed to slide along the splined connection. This connection takes the form of ridges or flutes, usually called splines, formed on the mutually facing surfaces of the drive shaft 11 and the coupling ring 15. These splines on the respective surfaces cooperate with one another so that the ring 15 and the shaft 11 can move axially relative to one another but are prevented from rotating relative to one another. The coupling ring 15 is situated either directly round the drive shaft 11 or as in the diagram, in which there is also an intermediate element 16 placed between the drive shaft 11 and the coupling ring 15. The element 16 has at its axially outer end bearing seats for the bearings 12 of the carrier 14 and has on its radially outer portion splines which cooperate with corresponding splines on the coupling ring 15 so that the ring 15 is movable axially relative to the element 16 along the splined connection between them. The position in the radial direction for the splined connection between the element 16 and the coupling ring 15 is so adapted that the tooth forces will be manageable on the axial extent of the splined connection.

A coupling fork 17 situated round the coupling ring 15 is so configured that it at least partly surrounds the coupling ring 15. Like the coupling ring 15, the coupling fork 17 is movable axially relative to the drive shaft 11. The coupling fork 17 is in engagement with the coupling ring 15 via a groove 33 in the outer surface of the coupling ring and its function for coupling/uncoupling purposes is to move the coupling ring 15 between a state of engagement with the carrier and a state of disengagement from the carrier. The coupling fork 17 is firmly anchored in surrounding structures.

The device comprises also an activating device 20 which acts upon the coupling fork 17 in order to move the latter, and hence also the coupling ring 15 anchored in the coupling fork, in an axial direction along the drive shaft 11. The activating device 20 may be configured in various ways so long as it generates the necessary movement of the coupling fork 17 and the relating coupling ring in desired directions.

When the drive of the driven unit 30 is not coupled to the drive shaft, there is no engagement between the teeth 19 on the coupling ring 15 and the tooth tracks 18 of the carrier 14. The drive shaft's rotation is therefore not transmitted to the carrier 14. Coupling the drive shaft 11 to the unit 30 which is to be driven involves the activating device 20 being activated via a control device 34 so that the device moves the coupling fork 17 in an axial direction away from the activating device 20. The movement of the coupling fork 17 then also generates, owing to the engagement between the coupling fork 17 and the coupling ring 15, a movement of the coupling ring 15 in an axial direction towards the carrier 14. When the coupling ring 15 reaches the carrier, the tooth tracks 18 on the carrier and the teeth 19 on the coupling ring 15 become coupled together so that the carrier 14 is rotationally locked to the drive shaft 11, enabling the necessary torque to be transmitted from the drive shaft 11 to the driven unit 30 via the coupling ring 15 and the carrier 14.

FIG. 1 also depicts a bearing 21 for stabilising the drive shaft 11, a surrounding sleeve 22 for protecting the constituent parts of the device 10, and a structure 23 in which the device is anchored. It should be noted that both the carrier 14 itself and its parts which cooperate in its uncoupling/coupling via the coupling ring 15 are situated on the end of the drive shaft 11 axially beyond the bearing 21. The carrier 14 is rotatable relative to sealing elements on the outer radial surface of the carrier 14 which seal against the sleeve 22.

The invention is described above on the basis of an embodiment, but the device and the configuration of the constituent parts may be modified without departing from the concept of the invention. For example:

The configuration of the parts may be modified.

Further parts or components may be added to optimise the device for a specific application.

The specific location of the device in existing systems may be altered in light of prevailing requirements, e.g. available space.

Although the invention is described above on the basis of some exemplifying embodiments, it is not limited to them but is defined on the basis of the accompanying claims.

The invention claimed is:

1. A device for uncoupling/coupling a vehicle's wheel drive shaft, so as to uncouple/couple a driven unit from/to the vehicle drive shaft having an end, the device comprising:
   at least one first bearing fitted around the end of the drive shaft;
   a carrier is coupled to the driven unit or to the drive shaft, the carrier having an inner cavity positioned and configured to surround the end of the drive shaft and the first bearing, the carrier being fastened to the first bearing to be freely rotatable relative to the drive shaft;
   a coupling ring coupled rotationally to the drive shaft and being movable in an axial direction of the drive shaft;
   a coupling ring moving device which at least partly surrounds the coupling ring, the coupling ring moving device is movable in the axial direction of the drive shaft; and
   an activating device which acts upon the coupling ring moving device to move the coupling ring moving device in the axial direction of the drive shaft,
   wherein coupling the drive shaft to the driven unit involves the coupling ring moving device and the coupling ring being moved in the axial direction of the drive shaft toward the carrier by the activating device so that the drive shaft becomes rotationally coupled with the carrier and the driven unit via the coupling ring;
   a structure configured to anchor the device; and
   a stabilizing bearing positioned and configured to stabilize the drive shaft in relation to the structure,
   wherein the carrier, the coupling ring and the coupling ring moving device are positioned at the end and distal to the stabilizing bearing along an axial direction of the drive shaft,
   wherein the carrier is part of a universal joint on the drive or driven shaft; and further comprising:
   an intermediate element intermediate relative to the drive shaft and the coupling ring, the intermediate element is situated torque-transmittingly on the drive shaft, and the bearing for the carrier supported on the drive shaft, and the splined connection is configured between the coupling ring and the intermediate element,
   wherein the first bearing radially surrounds the intermediate element.

2. The device according to claim 1, wherein the carrier is adjacent to part of a universal joint.

3. The device according to claim 1, wherein the carrier and the coupling ring comprise mutually facing sides which engage.

4. The device according to claim 1, further comprising:
   a splined connection rotationally coupling the coupling ring to the drive shaft,
   wherein the splined connection allows the coupling ring to move in the axial direction of the drive shaft.

5. The device according to claim 1, further comprising a second device configured for preventing the coupling ring moving device from rotating with the coupling ring and the drive shaft.

6. The device according to claim 1, wherein the activating device is powered by compressed air or an electric motor and acts in an axial direction of the coupling ring moving device when the coupling ring is to be coupled to/uncoupled from the carrier.

7. The vehicle comprising at least one gearbox or shaft gear and comprising an output drive shaft therefrom, and the device according to claim 1 which is separate from the gearbox or the shaft gear.

8. The device according to claim 3, wherein the mutually facing sides are provided with matching teeth.

9. The device according to claim 1, wherein the coupling ring has an outer periphery and the coupling ring moving device engages the outer periphery of the coupling ring.

10. The device according to claim 1, wherein the coupling ring moving device comprises a coupling fork.

11. The device according to claim 10, wherein the coupling ring comprising an outer periphery with a groove therein and the coupling fork is in engagement with the coupling ring about the groove in the outer periphery of the coupling ring.

* * * * *